Sept. 1, 1970

P. AUGUST 3,526,305

TRANSMISSION

Filed Feb. 9, 1968

INVENTOR.
PAUL AUGUST

United States Patent Office 3,526,305
Patented Sept. 1, 1970

1

3,526,305

TRANSMISSION

Paul August, Capellades, Barcelona, Spain

Filed Feb. 9, 1968, Ser. No. 704,311
Claims priority, application Germany, Feb. 11, 1967, P 41,396
Int. Cl. F16h *47/00, 57/10*
U.S. Cl. 192—4 3 Claims

ABSTRACT OF THE DISCLOSURE

A drive transmission including a fluid torque converter and a toothed mechanical drive coupling in the drive shaft train following the torque converter. A brake is used to slow or stop the rotating portion of the coupling so as to match its speed to that of the remainder of the coupling and allow engagement of the coupling parts without undue clashing of the coupling teeth.

This invention relates to a drive transmission having a hydraulic torque converter or a hydraulic clutch and in which a driven part of the transmission which revolves during idling of the drive engine as well as during high-speed operation can be connected to a part of the transmission which is stationary or revolves at a speed different from that of the driven part of the transmission.

In such a transmission, the parts to be engaged with one another have teeth or dogs. Thus, the operation of such a transmission requires that any differential speed between the rotating driven part of the transmission and the relatively stationary part be substantially eliminated in order to make possible the interengagement of the two transmission parts without undue clashing of the teeth. For this reason, known transmissions of this kind are provided with friction clutches for equalizing the rotational speeds prior to the interengagement of the dogs or gears, and these clutches are rather bulky and expensive.

The present invention has, therefore, the object of providing a transmission whereby separate drive shaft members can be connected by means of a toothed or dog coupling without the need for bulky or expensive clutches.

According to the invention this object is realized in that there is provided, instead of a clutch, a brake acting on the revolving part of the transmission. The advantages of such a brake, compared with clutches, are substantial. Very simple braking elements can be used, acting on particularly suitable points of the revolving transmission member or its drive. Also, the brake can comprise, in essence, a relatively thin brake band and a small tightening cam, and the transmission thus can be made to be very compact. The brake may be positioned at any point between the hydraulic converter or the hydraulic clutch and the stationary part of the transmission.

The brake may be actuated in various ways. For example, in one of the simplest embodiments, the brake can be operated independently of the gear change of the transmission and these two operations can be synchronized manually by the operator. The brake also can be constructed so that it is operated essentially only during idling of the drive engine. However, it is preferred that the brake be associated with actuating means whereby the revolving transmission member is slowed or stopped for only a short period during the coupling of the two transmission members. By means of this feature, the brake is used only for such a period as is needed for coupling the two transmission members.

Further aspects and advantages of the invention will

2 be pointed out in or apparent from the following description and drawings. In the drawings:

Figure 1:
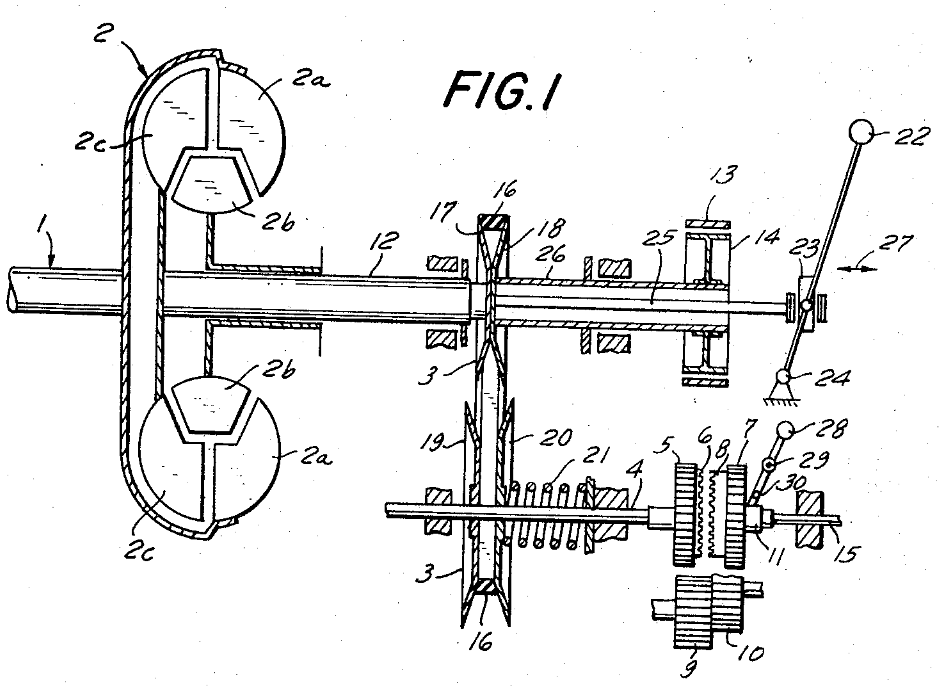
FIG. 1 shows schematically a transmission constructed in accordance with the invention.

The stepless transmission shown in FIG. 1 of the drawings contains a fluid torque converter or clutch 2 driven by an engine (not shown) connected to a shaft 1. The torque converter 2 is of a conventional type, sometimes known as a "Fottinger" converter, and includes a "pump" *2a* connected to drive shaft 1, a stator *2b*, and a "turbine" *2c*, with a fluid coupling the parts together. The torque converter 2 drives a shaft 12 which acts on a infinitely variable belt drive structure 3 which transmits the torque to a transmission shaft 4. The shaft 4 carries a gear 5 with coupling dogs or teeth 6. The gear 5 revolves not only when the drive shaft 1 is driven at high speeds, but also when it is idling. The gear 5 is associated with another gear 7, having coupling dogs or teeth 8, and is slidably mounted by means of a sliding coupling 11 on a driven shaft 15 which may, for example, drive the wheels of a vehicle. The gear 7 rotates with the shaft 15 and may be stationary or may rotate at a speed different from that of the gear 5. Further, transmission members 9 and 10 are provided as reverse gearing, as known in the art.

The variable pulley drive structure 3 includes a V-belt 16, a first pulley consisting of a fixed sheave 18 and a sheave 17 slidable on a flattened portion of the shaft 12 to spread the sheaves 17 and 18 apart. A second pulley with split sheaves 19 and 20 is drivably coupled to the shaft 4. A compression spring thrusts sheaves 19 and 20 towards one another. A speed change lever 22, which is pivoted at 24, is pivotally connected to a rod 25 which is rotatably connected to the sheave 17. When the lever 22 is shifted in the direction indicated by arrow 27, the sheaves 17 and 18 either are spread apart or are brought closer together. This reduces or increases the effective diameter of the upper pulley while inversely changing the diameter of the lower pulley to change the drive ratio of the transmission.

The shaft 12 is associated with a brake which includes a band 13 and a fly wheel 14 fastened to the shaft 12. The shaft 12 revolves when the engine is idling and when it turns rapidly so that interengagement between the gear teeth 6 and 8, or between the forward and reverse gears is not possible as long as the differential speed between the members to be coupled has not been reduced or eliminated. Reduction of the differential speed is achieved by braking the shaft 12 together with the belt drive 3 and revolving transmission members 4 and 5. When the speed differential between the gears 5 and 7 has been eliminated, the gears 6 and 8 can be pushed into engagement by means of a shift lever 28, for example, thus causing the shafts 12 and 15 to be interconnected. The brake then is disconnected after the coupling connection has been made so that the torque of the torque converter, and thus the drive of the engine shaft 1, drives the driven shaft 15.

Figure 2:
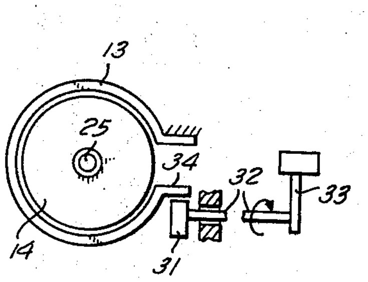
FIG. 2 shows, schematically, a portion of the transmission shown in FIG. 1.

As has been noted above, the braking and coupling operations can be synchronized manually. A brake actuating arrangement suitable for this mode of operation is shown in FIG. 2, which is an end view of the brake band 13 and brake drum 14. A cam member 31 is mounted on a shaft 32 which can be rotated by a lever or pedal 33 so as to thrust the cam 31 upwardly against one flanged end 34 of the brake band 13 to tighten the brake band on the drum and provide a braking force.

Figure 4:
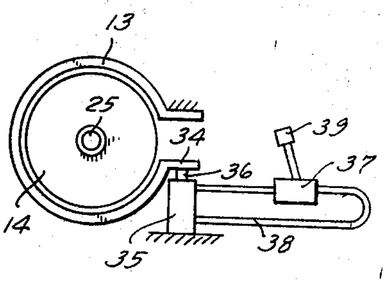

The arrangement shown in FIG. 4 is similar to that shown in FIG. 2 except a piston 36 sliding in a cylinder 35 replaces the cam 31. The piston 36 is hydraulically driven through hydraulic lines 38 by a pedal or lever 39 driving another piston 37.

Figure 3:
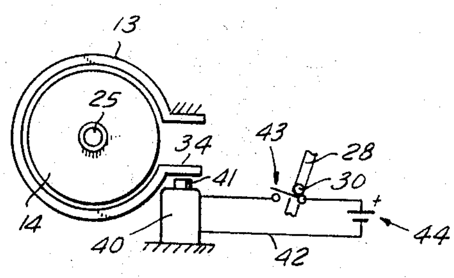
FIGS. 3 and 4 show alternative embodiments of the structure shown in FIG. 2.

Synchronization alternatively can be performed simply by connecting the shift lever 28 to the brake actuating means so that operation of the shift lever operates the brake to equalize the speeds of the coupling members automatically. FIG. 3 shows such an arrangement in which the plunger 41 of an electrical solenoid 40 drives the flanged end 34 of the brake band 13 to tighten it on the drum 14. An electrical power supply 44 supplies energy to the solenoid over wires 42 through a switch 43. A roller 30 on shift lever 28 engages the spring-biased contact arm of and thus closes the switch 43 while it moves to engage the coupling parts. This energizes the solenoid 40 and tightens the band 13. When the roller 30 has moved towards the left in FIG. 3 past the switch 43, the switch opens itself again so that the brake is de-energized and will allow power to be transmitted to the transmission shaft 15 from the drive shaft 1. When the gears are disengaged by movement of lever 28 to the left, the roller 30 moves to the right but does not close switch 43 but instead pivots the contact arm of the switch backwards until the roller has moved past the arm.

The above description of the invention is intended to be illustrative and not limiting. Various changes or modifications in the embodiments described may occur to those skilled in the art and these can be made without departing from the spirit or scope of the invention as set forth in the claims. For example, it should be noted that the invention operates to synchronize the moving parts during shifting into reverse as well as forward gears. Other brake actuating means which are well known in the art can be used in addition to those shown and described herein.

I claim:

1. A drive transmission comprising, in combination, a hydraulic torque converter, a drive member and a driven member coupled together by said torque converter, a torque transmitting member, and coupling means on said driven and transmitting members for coupling said driven and said transmitting members together when the latter are brought into engagement with one another, said coupling means including a V-belt drive coupling and shiftable gear means, means for shifting said gears, brake means for braking the rotation of and thereby decelerating said driven member to equalize the speeds of said driven and transmitting members during shifting of said gear means, an electrical switch, means for actuating said switch upon movement of said shifting means, and means for actuating said brake means in response to actuation of said switch.

2. A transmission as in claim 1 in which said gear means includes gears shiftable into engagement with one another to complete the coupling of said driven and transmitting members to one another, said shifting means including a shift lever movable to an engagement position in which said gears engage one another, said switch actuating means being adapted to actuate said switch during movement of said shift lever towards said engagement position, but to de-actuate said switch when said lever reaches said engagement position.

3. A transmission as in claim 2 in which the brake actuating means includes electrical motive means, electrical source means therefor, said switch being normally open and interconnecting said motive means and said source means when closed.

References Cited

UNITED STATES PATENTS

| | | | |
|---|---|---|---|
| 654,620 | 7/1900 | Garver | 192—4 X |
| 1,230,896 | 6/1917 | Haupt | 192—4 |
| 1,667,565 | 4/1928 | Radcliffe | 74—732 |
| 2,084,219 | 6/1937 | Salerni | 74—732 |
| 2,787,172 | 4/1957 | Gros | 192—4 X |
| 2,847,093 | 8/1958 | De Lorean | 188—77 |
| 2,961,078 | 11/1960 | Shannon et al. | 192—4 |

FOREIGN PATENTS 51,333 1/1942 France.
(Addition to No. 842,853)

ARTHUR T. McKEON, Primary Examiner

U.S. Cl. X.R.

74—732